(12) United States Patent
Kim et al.

(10) Patent No.: US 9,375,995 B2
(45) Date of Patent: Jun. 28, 2016

(54) HEATER APPARATUS FOR VEHICLE (71) Applicants: Hyundai Motor Company, Seoul (KR); Kia Motors Corp., Seoul (KR); DOOWON CLIMATE CONTROL CO., LTD, Asan-si (KR)

(72) Inventors: Myung Hoe Kim, Whasung-Si (KR); In Gyu Kim, Whasung-Si (KR); Jong Chul Kim, Whasung-Si (KR)

(73) Assignees: Hyundai Motor Company, Seoul (KR); Kia Motors Corporation, Seoul (KR); DOOWON CLIMATE CONTROL CO., LTD, Asan-si (KR)

( * ) Notice: Subject to any disclaimer, the term of this patent is extended or adjusted under 35 U.S.C. 154(b) by 256 days.

(21) Appl. No.: 14/076,843

(22) Filed: Nov. 11, 2013

(65) Prior Publication Data

US 2015/0060428 A1 Mar. 5, 2015

(30) Foreign Application Priority Data

Aug. 28, 2013 (KR) ........................ 10-2013-0102578

(51) Int. Cl.
| | |
|---|---|
| B60L 1/02 | (2006.01) |
| B60H 1/22 | (2006.01) |
| B60H 1/00 | (2006.01) |
| F24H 3/04 | (2006.01) |
| F24H 3/12 | (2006.01) |
| F24H 9/18 | (2006.01) |
| H05B 3/50 | (2006.01) |

(52) U.S. Cl.
CPC .......... *B60H 1/2225* (2013.01); *B60H 1/00328* (2013.01); *F24H 3/0429* (2013.01); *F24H 3/12* (2013.01); *F24H 9/1863* (2013.01); *H05B 3/50* (2013.01); *B60H 2001/2296* (2013.01); *H05B 2203/016* (2013.01); *H05B 2203/02* (2013.01); *H05B 2203/023* (2013.01)

(58) Field of Classification Search
CPC ...... B60H 1/2296; B60H 1/2225; B60H 1/14; B60H 1/00328; B60H 1/2228; B60H 1/2231; B60H 1/2234; B60H 1/2237; B60H 2001/2278; B60H 2001/2237; B60H 2001/2287; B60H 2001/2296; B60H 2001/00328; B60H 2001/2215; F24H 9/1872; F24H 9/1863; F24H 9/00; F24H 3/0405; F24H 3/04; F24H 3/29; F24H 3/12; H05B 3/14; H05B 3/16; H05B 3/32; H05B 3/22; H05B 3/26; H05B 3/266; H05B 3/50; H05B 2203/009; H05B 2203/02; H05B 2203/016; H05B 2203/023
See application file for complete search history.

(56) References Cited

U.S. PATENT DOCUMENTS

2012/0152931 A1* 6/2012 Bohlender ............ F24H 3/0405
219/520

FOREIGN PATENT DOCUMENTS

| KR | 10-2007-0080656 A | 8/2007 |
|---|---|---|
| KR | 10-2009-0102478 A | 9/2009 |
| KR | 10-2011-0134621 A | 12/2011 |
| KR | 10-2012-0037618 A | 4/2012 |
| KR | 10-2013-0036338 A | 4/2013 |

* cited by examiner

*Primary Examiner* — Shawntina Fuqua
(74) *Attorney, Agent, or Firm* — Morgan, Lewis & Bockius LLP (57) ABSTRACT

A heater apparatus for a vehicle may include a main heater of a vehicle, and an auxiliary heater coupled with the main heater at the rear side thereof and having a housing including an edge part and an inner part, wherein heat radiation fins and positive temperature coefficient (PTC) element assemblies are coupled with the housing at the front surface thereof.

18 Claims, 9 Drawing Sheets

HEATER APPARATUS FOR VEHICLE

CROSS REFERENCE TO RELATED APPLICATION

The present application claims priority to Korean Patent Application No 10-2013-0102578, filed on Aug. 28, 2013, the entire contents of which is incorporated herein for all purposes by this reference.

BACKGROUND OF THE INVENTION

1. Field of the Invention

The present invention relates to a heater apparatus in which a main heater and an auxiliary heater are coupled, and more particularly, to a heater apparatus capable of quickly heating by virtue of positive temperature coefficient (PTC) elements installed therein.

2. Description of Related Art

Vehicles are equipped with heater apparatuses for heating inside air. In cold winter when the temperature of outdoor air is very low, the indoor temperature of a vehicle is kept at room temperature, and vehicles focus on heating until indoor temperature reaches a temperature at which passengers feel comfortable.

Figure 1:
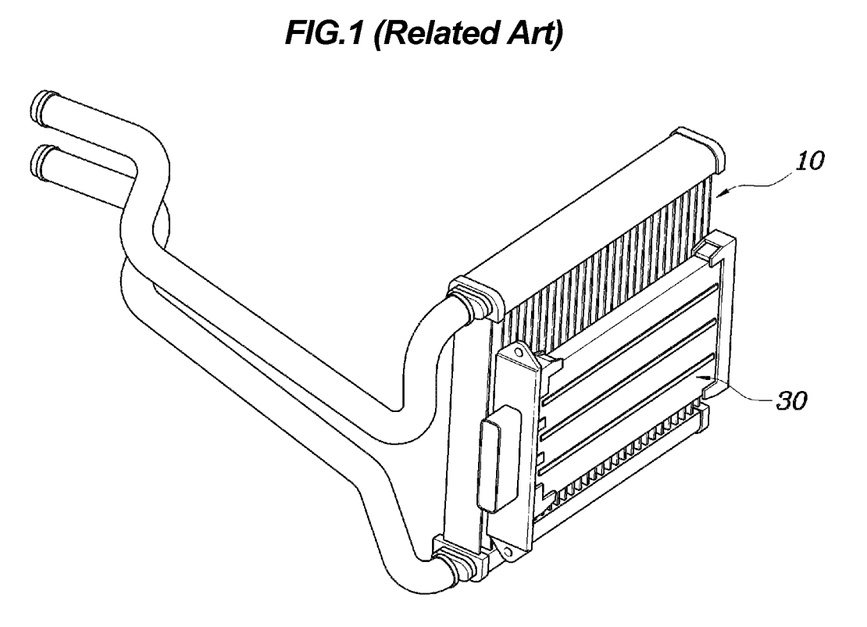
FIG. 1 is a view of a heater apparatus for a vehicle according to the prior art.

FIG. 1 shows a conventional heater apparatus for a vehicle, in which an auxiliary heat 30 having PTC elements mounted thereon is installed at the rear surface of a main heater 10. However, since the size of the main heater 10 is different from that of the auxiliary heat 30, there has been a temperature deviation in air flowing into a vehicle between the air which passes through the auxiliary heater and the air which passes through the main heater 10 only.

To overcome this drawback, Korean Patent Laid-open Publication No. 10-2007-0080656, entitled "An Assembly Method of Auxiliary Heater of Heat Core In Car," discloses an assembly method of an auxiliary heater of a heater core in a car including bonding a pair of heat radiation fins integrally to a tube by braising, inserting an auxiliary heater between the pair of heat radiation fins to assemble them, and fixing the outer perimeter of a heater core with a band member, so as to increase contacting area between the auxiliary heater and the heat radiation fins. According to the method, heat transmission is facilitated. Further, since the space for installing the auxiliary heater may be replaced by the space for installing the heat radiation fins, the auxiliary heater can be assembled without any additional space, such that the manufacturing process can be simplified. However, the process disclosed in the document is so complicated.

Therefore, required is a heater apparatus for a vehicle capable of suppressing temperature deviation in the air flowing into a vehicle by way of allowing the air to pass through both of the main heater and the auxiliary heater, increasing fuel efficiency, reducing weight and cost of a vehicle, and being optimally packaged so as to enable standardized process.

The matters described as the related art have been provided only for facilitating the understanding of the background of the present invention and should not be construed as acknowledging them as the prior art already known to those skilled in the art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a heater apparatus for a vehicle capable of suppressing a temperature deviation in the air flowing into a vehicle by way of allowing the air to pass through both of the main heater and the auxiliary heater, increasing fuel efficiency, reducing weight and cost of a vehicle, and being optimally packaged so as to enable standardized process.

According to an exemplary embodiment of the present invention, there is provided a heater apparatus for a vehicle, including, a main heater of a vehicle, and an auxiliary heater coupled with the main heater at the rear side thereof and having a housing including an edge part and an inner part, wherein heat radiation fins and positive temperature coefficient (PTC) element assemblies are coupled with the housing at the front surface thereof.

The main heater and the auxiliary heater may be integrally coupled with each other with a predetermined distance therebetween.

The inner part of the housing of the auxiliary heater may have the same area with the area of a core of the main heater.

At both sides of the edge part of the auxiliary heater, bar-like, side-supporting parts may be formed in the vertical direction from the edge part toward the inner part, and on the rear surface of the side-supporting parts, heat radiation fins may be formed in the vertical direction.

At both sides of the edge part of the auxiliary heater, bar-like, side-supporting parts may be formed in the vertical direction from the edge part toward the inner part, and on the rear surface of the side-supporting parts, PTC element assemblies may be formed in the vertical direction.

At both sides of the edge part of the auxiliary heater, bar-like, side-supporting parts may be formed in the vertical direction from the edge part toward the inner part, and on the rear surface of the side-supporting parts, the heat radiation fins and the PTC element assemblies may be formed in the vertical direction, wherein the heat radiation fins and the PTC element assemblies are disposed discretely.

The entire inner part of the housing is penetrated so as to may have a penetration hole therein. At a center of the penetration hole, a bar-like, center-supporting part may be formed extending from the upper end to the lower end of the penetration hole, and on the rear surface of the center-supporting part, the heat radiation fins and the PTC element assemblies may be formed in the vertical direction, and the heat radiation fins and the PTC element assemblies may be disposed discretely.

The heat radiation fins of the auxiliary heater may be corrugated in the height direction thereof.

The heat radiation fins of the auxiliary heater may be inclined by a predetermined angle so as to form a louver shape.

The edge part of the housing of the auxiliary heater may be extended toward the front of the auxiliary heater, and coupling parts surrounding an inlet and outlet of the main heater may be formed at the side ends of the auxiliary heater so that the auxiliary heater and the main heater may be coupled by fitting.

The edge part of the housing of the auxiliary heater may be extended toward the front of the auxiliary heater, a recess groove may be formed in the inner side of the side surface of the extended housing, and a blade of a side plate of the main heater may fit in the recess groove such that a distance between the main heater and the auxiliary heater is adjustable.

A height formed by the heat radiation fins of the auxiliary heater and the PTC element assemblies may be equal to a height formed by the heat radiation fins of the main heater and a tube.

The heat radiation fins of the auxiliary heater may be formed in the same direction in which the heat radiation fins of the main heater are formed.

A tube pitch formed by the heat radiation fins of the auxiliary heater and the PTC element assemblies may be equal to or less than a tube pitch of the heat radiation fins of the main heater.

The heater apparatus may further include a power terminal formed on the side surface of the housing of the auxiliary heater so as to supply power, wherein the power terminal is vertically formed in the same direction as that to which a pipe of the main heater is connected.

The power terminal of the auxiliary heater may be arranged in the housing of the auxiliary heater in a stepwise manner.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a heater apparatus for a vehicle according to an exemplary embodiment of the present invention will be described in detail with reference to the accompanying drawings.

Figure 2:
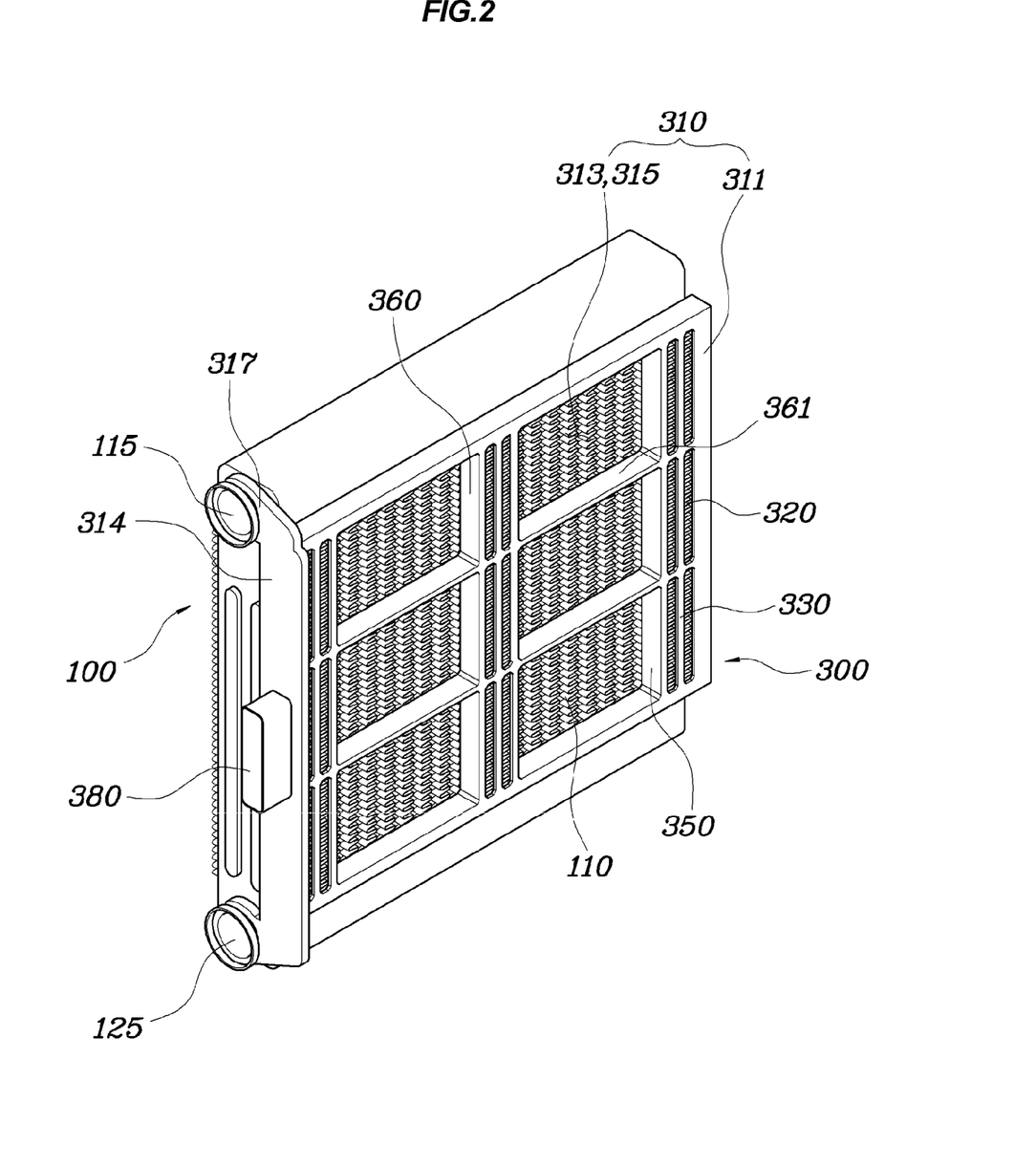
FIG. 2 is a view showing a heater apparatus for a vehicle according to an exemplary embodiment of the present invention.
Figure 3:
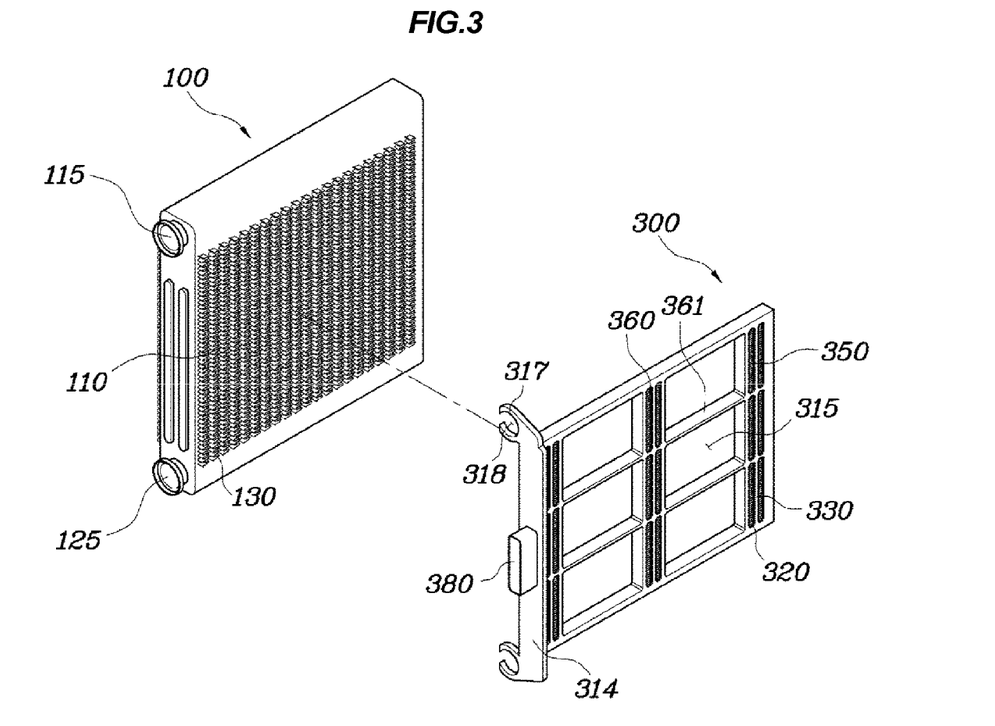
FIG. 3 is an exploded perspective view of the apparatus shown in FIG. 2.
Figure 4:
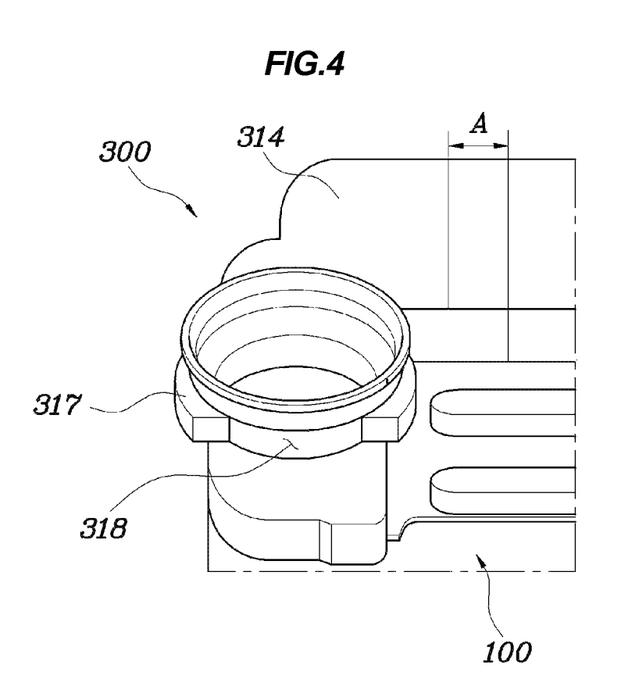
FIG. 4 is a view of an upper coupling part between a main heater and an auxiliary heater.
Figure 5:
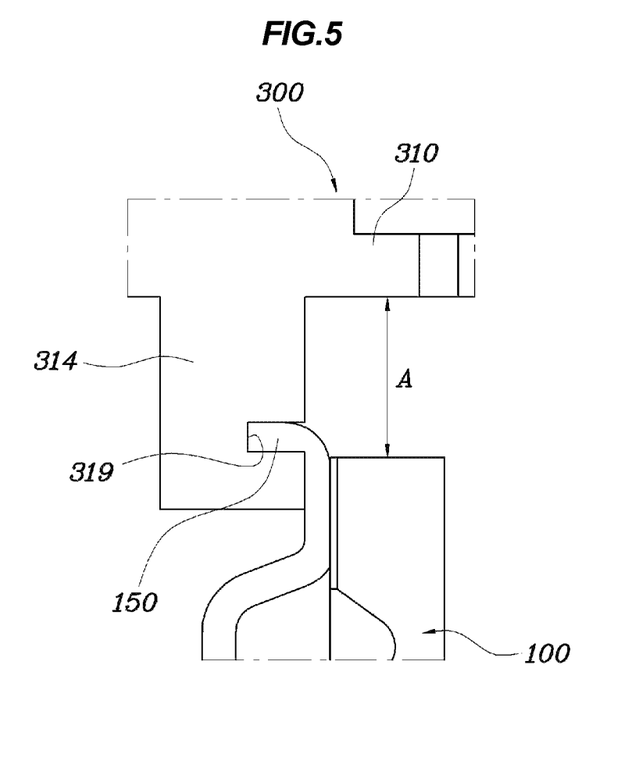
FIG. 5 is a view showing a side coupling part between the main heater and the auxiliary heater.
Figure 6:
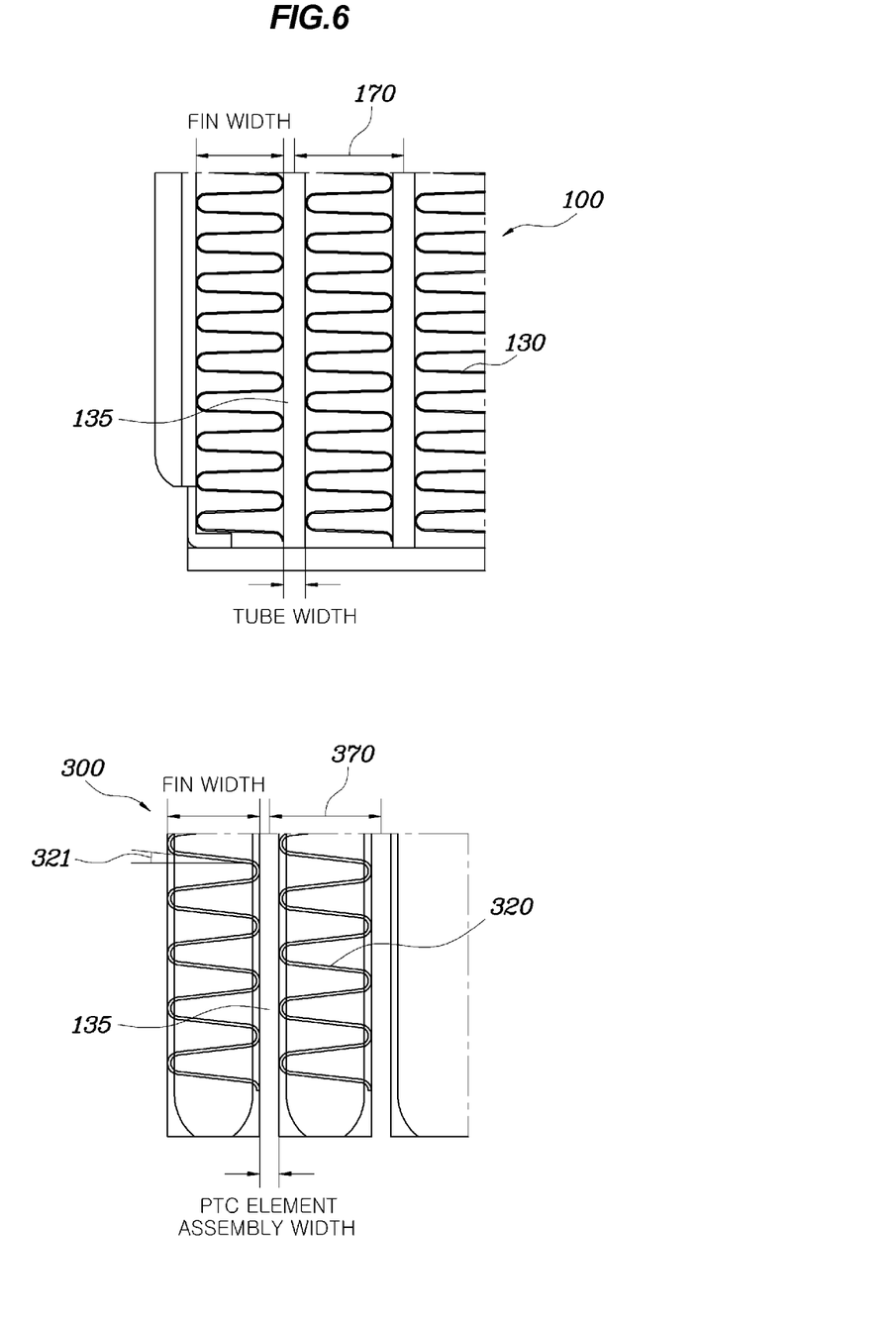
FIG. 6 is a pair of views showing the main heater and the auxiliary heater in detail.

FIG. 2 is a view showing a heater apparatus for a vehicle according to an exemplary embodiment of the present invention. FIG. 3 is an exploded perspective view of the apparatus shown in FIG. 2. FIG. 4 is a view of an upper coupling part between a main heater 100 and an auxiliary heater 300. FIG. 5 is a view showing a side coupling part between the main heater 100 and the auxiliary heater 300. In addition, FIG. 6 is a pair of views showing the main heater 100 and the auxiliary heater 300 in detail.

As shown in FIGS. 2 and 3, the heater apparatus according to the exemplary embodiment of the present invention includes a main heater 100 of a vehicle, and an auxiliary heater 300 which is coupled with the main heater 100 at the rear side and has a housing 310 including an edge part 311 and an inner part 313. Heat radiation fins 320 and PTC element assemblies 330 are coupled with housing 310 at the front surface.

Referring to FIG. 4, the auxiliary heater 300 is coupled with the main heater 100 at the rear surface such that they are integrated with a predetermined distance A. Although the predetermined distance A is set 1 to 5 mm in the exemplary embodiment, it may vary depending on design or environment.

The edge part 311 of the housing 310 of the auxiliary heater 300 is extended toward the front of the auxiliary heater 300. At ends of one side of the auxiliary heater 300, coupling parts 317 are formed such that they surround an inlet 115 and an outlet 125 through which a fluid (e.g., hot water) is supplied and discharged to and from the main heater 100. The coupling parts 317 surrounding the inlet 115 and outlet 125 of the main heater 100 have openings 318 such that the inlet 115 and outlet 125 of the main heater 100 fit in the coupling parts 317 of the auxiliary heater 300, so that the main heater 100 and the auxiliary heater 300 are packaged.

Referring to FIG. 5, at the side part 314 of the edge part 311 of the housing 310 that is extended toward the front of the auxiliary heater 300, a recess groove 319 that is recessed inwardly of the side part 314 from the surface of the side part 314 is formed. Accordingly, the blade part 150 of the side plate of the main heater 100 fits in the recess groove 319 in the side part 314 of the auxiliary heater 300, so that the distance A between the main heater 100 and the auxiliary heater 300 becomes adjustable, thereby supporting it to keep the predetermined distance A.

Further, the inner part 313 of the housing 310 of the auxiliary heater 300 is formed to have the same area with the core 110 of the main heater 100. The entire inner part 313 of the housing 310 is penetrated so as to have a penetration hole 315 therein.

At both sides of the edge part 311 of the auxiliary heater 300, bar-like side-supporting parts 350 are formed in the vertical direction toward the inner part 313 from the edge part 311. At the center part of the penetrating hole 315, bar-like center-supporting parts 360 extending from the upper end to the lower end of the penetrating hole 315 are formed. At the center-supporting part 360, auxiliary supporting parts 361 traversing the penetrating holes 315 horizontally with a predetermined distance therebetween are formed, such that the penetrating hole 315 are divided into several pieces by the auxiliary supporting parts 361. In the exemplary embodiment shown in FIGS. 2 and 3, the penetrating hole 315 is divided into six pieces by the auxiliary supporting parts 361.

On the rear surfaces of the center-supporting part 360 and the side-supporting part 350 formed in the penetrating hole 315 of the housing 310 of the auxiliary heater 300, the heat radiation fins 320 and the PTC element assemblies 330 formed in the vertical direction are coupled. As shown in FIG. 3, the PTC element assemblies 330 have 1 to 6 columns, and the heat radiation fins 320 and the PTC element assemblies 330 are discrete from one another. In addition, the heat radiation fins 320 of the auxiliary heater 300 and the PTC element assemblies 330 are injection-molded to be mechanically assembled. In particular, the heat radiation fins 320 and the PTC element assemblies 330 are assembled with a high-temperature heat-resisting adhesive.

In the heat radiation fins 320 of the auxiliary heater 300, the heat radiation fins 320 are corrugated in the height direction and are inclined by a predetermined angle to form a louver shape. In the exemplary embodiment shown in FIG. 6, the louver angle 321 is 15 degree or less.

The heat radiation fins 320 of the auxiliary heater 300 form a louver angle 321 such that they do not fully overlap with the heat radiation fins 130 of the main heater 100. Accordingly, one of the heat radiation fins 320 of the auxiliary heater 300, which is heated faster than the main heater 100, spans across several heat radiation fins 130 of the main heater 100, so that heating becomes more efficiently.

Further, FIG. 6 shows a case that the height formed by the heat radiation fins 320 of the auxiliary heater 300 and the PTC element assemblies 330 is equal to the height formed by the tube 135 and the heat radiation fins 130 of the main heater 100. By having the height formed by the tube 135 and the heat radiation fins 130 of the main heater 100 equal to the height formed by the heat radiation fins 320 of the auxiliary heater 300 and the PTC element assemblies 330, heat may be transmitted faster and effectively.

As shown in FIG. 6, the heat radiation fins 320 of the auxiliary heater 300 are formed in the same direction in which the heat radiation fin 130 of the main heater 100 is formed. A tube pitch 370 formed by the heat radiation fin 320 of the auxiliary heater 300 and the PTC element assemblies 330 may be equal to or less than a tube pitch 170 of the heat radiation fin 130 of the main heater 100, so that heating by the auxiliary heater 300 is more effectively transmitted to the heat radiation fin 130 of the main heater 100.

Figure 7:
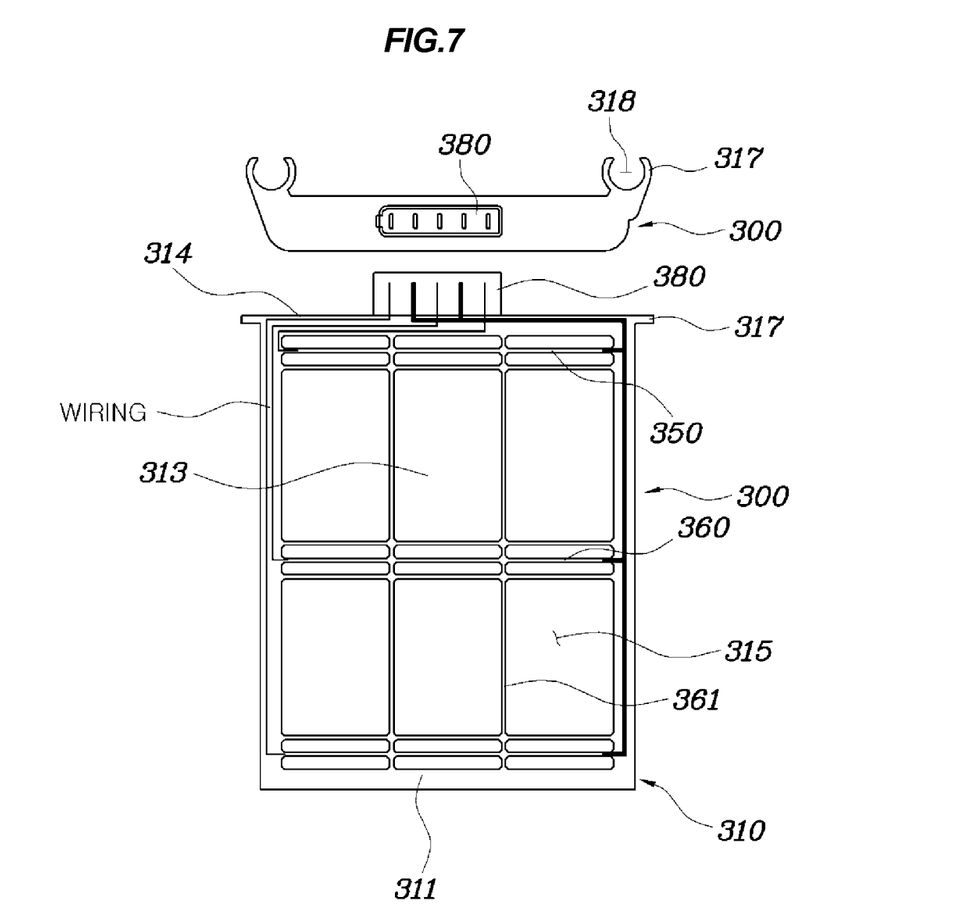
FIG. 7 is a view showing a side surface and inner wirings of the auxiliary heater.
Figure 8:
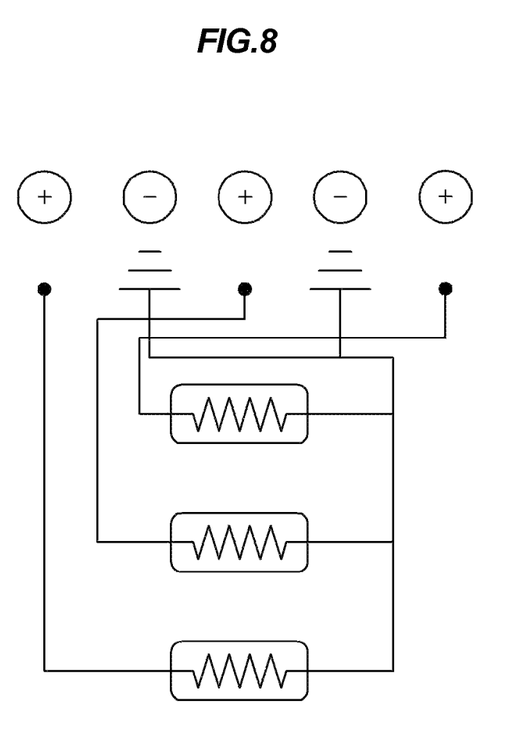
FIG. 8 is a view showing terminal arrangement and a circuit diagram in the power terminal of FIG. 7.

FIG. 7 is a view showing a side surface of the auxiliary heater 300, and FIG. 8 is a view showing terminal arrangement and a circuit diagram in the power terminal 380 of FIG. 7. The power terminal 380 projects from the side surface of the housing 310 of the auxiliary heater 300 so as to supply power to the auxiliary heater 300. The power terminal 380 is vertically formed in the same direction as that to which a pipe 145 of the main heater 100 is connected. The fluid of the main heater 100 flows through the pipe 145. For effective arrangement, the power terminal 380 of the auxiliary heater 300 is arranged in the housing 310 of the auxiliary heater 300 in a stepwise manner.

Figure 9:
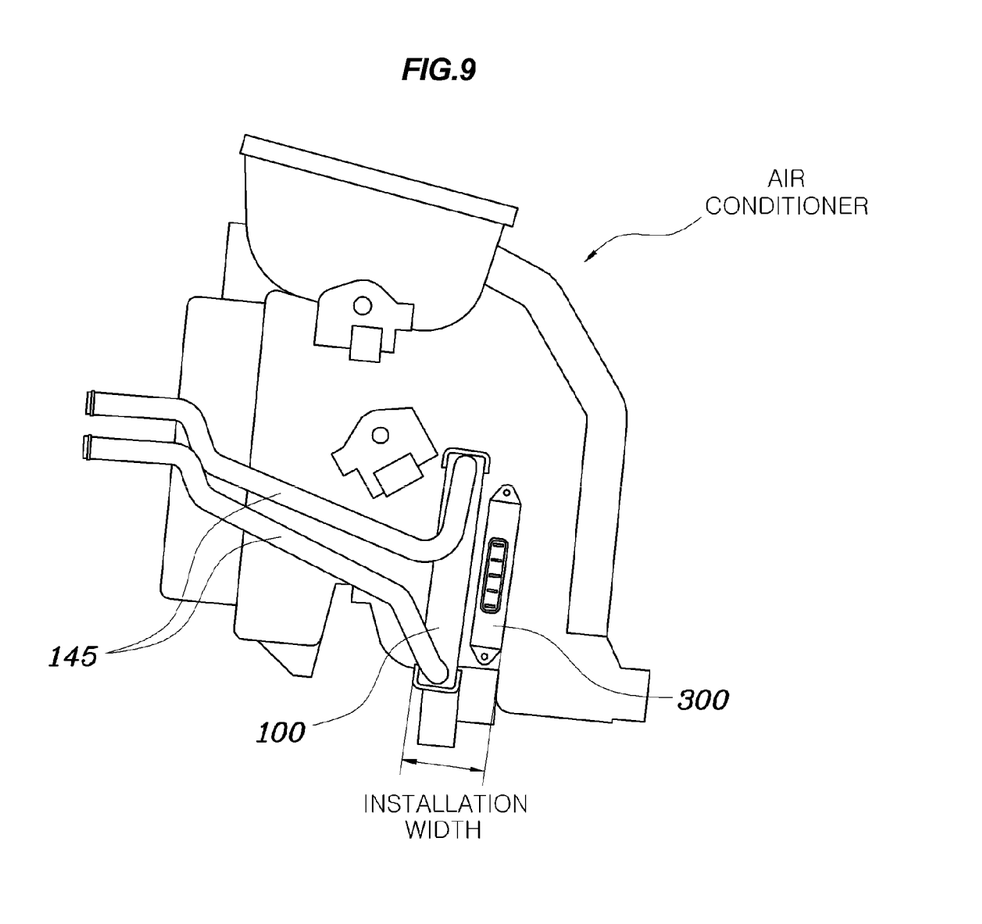
FIG. 9 is a view of a heater apparatus for a vehicle installed in an air-conditioner.

Conventionally, when a heater apparatus is installed in an air-conditioning apparatus, a space of approximately 66 mm has been required when a main heater and an auxiliary heater overlap each other. In contrast, as shown in FIG. 9, the heater apparatus according to an exemplary embodiment of the present invention in which the main heater 100 and the auxiliary heater 300 are integrated occupies a space of only 38 mm. Therefore, it is possible to reduce the space or utilize it for another purpose, so that the degree of freedom in design is increased, weight of a vehicle is reduced, and cost of the vehicle is saved.

Further, since all of the air flowing into a vehicle passes through both the main heater and the auxiliary heater, there is no temperature deviation, thereby increasing heating efficiency. By improving the efficiency of the auxiliary heater, fuel efficiency can be increased.

As set forth above, according to the exemplary embodiments of the present invention, the degree of freedom in design can be increased so that weight and cost of a vehicle can be reduced, since the heater apparatus according to an exemplary embodiment of the present invention in which the main heater and the auxiliary heater are monolithically packaged occupies a space of only 38 mm, compared to conventional heater apparatuses requiring a space of approximately 66 mm, taking into account the total width of a main heater and an auxiliary heater, so that it is possible to reduce the space or utilize it for another purpose.

Further, since all of the air flowing into a vehicle passes through both the main heater and the auxiliary heater, there is no temperature deviation, thereby increasing heating efficiency. By improving the efficiency of the auxiliary heater, fuel efficiency can be increased.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A heater apparatus for a vehicle, comprising:
   a main heater of the vehicle; and
   an auxiliary heater coupled with the main heater at a rear side thereof and having a housing including an edge part and an inner part, wherein heat radiation fins and positive temperature coefficient (PTC) element assemblies are coupled with the housing at a front surface thereof, and
   wherein a tube pitch formed by the heat radiation fins of the auxiliary heater and the PTC element assemblies is equal to or less than a tube pitch of the heat radiation fins of the main heater.

2. The heater apparatus according to claim 1, wherein the main heater and the auxiliary heater are integrally coupled with each other with a predetermined distance therebetween.

3. The heater apparatus according to claim 1, wherein the inner part of the housing of the auxiliary heater has the same area with an area of a core of the main heater.

4. The heater apparatus according to claim 1, wherein at both sides of the edge part of the auxiliary heater, bar-like, side-supporting parts are formed in a vertical direction from the edge part toward the inner part, and wherein on a rear surface of the side-supporting parts, heat radiation fins are formed in the vertical direction.

5. The heater apparatus according to claim 1, wherein at both sides of the edge part of the auxiliary heater, bar-like, side-supporting parts are formed in a vertical direction from the edge part toward the inner part, and wherein on a rear surface of the side-supporting parts, the PTC element assemblies are formed in the vertical direction.

6. The heater apparatus according to claim 1, wherein at both sides of the edge part of the auxiliary heater, bar-like, side-supporting parts are formed in a vertical direction from the edge part toward the inner part, and wherein on a rear surface of the side-supporting parts, the heat radiation fins and the PTC element assemblies are formed in the vertical direction, wherein the heat radiation fins and the PTC element assemblies are disposed discretely.

7. The heater apparatus according to claim 1, wherein an entire inner part of the housing is penetrated so as to have a penetration hole therein.

8. The heater apparatus according to claim 7, wherein at a center of the penetration hole, a bar-like, center-supporting part is formed extending from an upper end to a lower end of the penetration hole, and wherein on a rear surface of the center-supporting part, the heat radiation fins and the PTC element assemblies are formed in the vertical direction, wherein the heat radiation fins and the PTC element assemblies are disposed discretely.

9. The heater apparatus according to claim 1, wherein the heat radiation fins of the auxiliary heater are corrugated in a height direction thereof.

10. The heater apparatus according to claim 1, wherein the heat radiation fins of the auxiliary heater are inclined by a predetermined angle so as to form a louver shape.

11. The heater apparatus according to claim 1, wherein the edge part of the housing of the auxiliary heater is extended toward a front of the auxiliary heater, and wherein coupling parts surrounding an inlet and an outlet of the main heater are formed at side ends of the auxiliary heater so that the auxiliary heater and the main heater are coupled by fitting.

12. The heater apparatus according to claim 1, wherein the edge part of the housing of the auxiliary heater is extended toward a front of the auxiliary heater, wherein a recess groove is formed in an inner side of a side surface of the extended housing, and wherein a blade of a side plate of the main heater fits in the recess groove such that a distance between the main heater and the auxiliary heater is adjustable.

13. The heater apparatus according to claim 1, wherein a height formed by the heat radiation fins of the auxiliary heater and the PTC element assemblies is equal to a height formed by the heat radiation fins of the main heater and a tube.

14. The heater apparatus according to claim 1, wherein the heat radiation fins of the auxiliary heater are formed in the same direction in which the heat radiation fins of the main heater are formed.

15. The heater apparatus according to claim 1, further comprising a power terminal formed on a side surface of the housing of the auxiliary heater so as to supply power, wherein the power terminal is vertically formed in the same direction as that to which a pipe of the main heater is connected.

16. The heater apparatus according to claim 15, wherein the power terminal of the auxiliary heater is arranged in the housing of the auxiliary heater in a stepwise manner.

17. A heater apparatus for a vehicle, comprising:
a main heater of the vehicle; and
an auxiliary heater coupled with the main heater at a rear side thereof and having a housing including an edge part and an inner part, wherein heat radiation fins and positive temperature coefficient (PTC) element assemblies are coupled with the housing at a front surface thereof,
wherein at both sides of the edge part of the auxiliary heater, bar-like, side-supporting parts are formed in a vertical direction from the edge part toward the inner part, and wherein on a rear surface of the side-supporting parts, the PTC element assemblies are formed in the vertical direction.

18. A heater apparatus for a vehicle, comprising:
a main heater of the vehicle; and
an auxiliary heater coupled with the main heater at a rear side thereof and having a housing including an edge part and an inner part, wherein heat radiation fins and positive temperature coefficient (PTC) element assemblies are coupled with the housing at a front surface thereof,
wherein at both sides of the edge part of the auxiliary heater, bar-like, side-supporting parts are formed in a vertical direction from the edge part toward the inner part, and wherein on a rear surface of the side-supporting parts, the heat radiation fins and the PTC element assemblies are formed in the vertical direction, wherein the heat radiation fins and the PTC element assemblies are disposed discretely.

* * * * *